United States Patent [19]

Matkin

[11] 4,363,333
[45] Dec. 14, 1982

[54] TOBACCO-SMOKE FILTERS

[75] Inventor: David A. Matkin, Southampton, England

[73] Assignee: British-American Tobacco Company Limited, London, England

[21] Appl. No.: 203,424

[22] Filed: Nov. 3, 1980

[30] Foreign Application Priority Data

Nov. 13, 1979 [GB] United Kingdom ............... 7939185
Jun. 13, 1980 [GB] United Kingdom ............... 8019460

[51] Int. Cl.³ .................. A24D 3/00; A24D 3/08; A24D 3/16
[52] U.S. Cl. .................. 131/334; 131/342; 131/336
[58] Field of Search ............... 131/334, 342, 336

[56] References Cited

U.S. PATENT DOCUMENTS

| T901,024 | 8/1972 | Sloan et al. | 131/334 |
| 3,251,365 | 5/1966 | Keith et al. | 131/334 |
| 3,460,543 | 8/1969 | Keith et al. | 131/334 |
| 4,163,452 | 8/1979 | Green et al. | 131/342 |

Primary Examiner—V. Millin
Attorney, Agent, or Firm—Kane, Dalsimer, Kane, Sullivan and Kurucz

[57] ABSTRACT

A nitric oxide filtration material or filter, particularly for tobacco smoke, comprises activated carbon, preferably in particulate form, upon which has been absorbed a C-nitroso compound, any substituent group of said compound, other than a nitroso group, being such as to have no critical adverse effect on the integrity of the nitroso group. The compound is preferably an aromatic compound such as nitrosobenzene, 2-nitrosotoluene or 2,4, 6-trimethylnitrosobenzene. Suitably the carbon is coal-based. Advantageously the carbon has been loaded with a metal, such as copper or iron at a loading level in the range of 0.1% to 5% by weight on an untreated carbon basis. The loading level of the C-nitroso compound may be in the range of 2% to 15%, preferably 2% to 7% by weight. Such a filter comprising the C-nitroso compound may advantageously also comprise ventilation means. The invention also comprises a method for the filtration of nitric oxide from a gaseous medium which comprises passing the medium in contact with a filtration material as hereinbefore defined.

16 Claims, 1 Drawing Figure

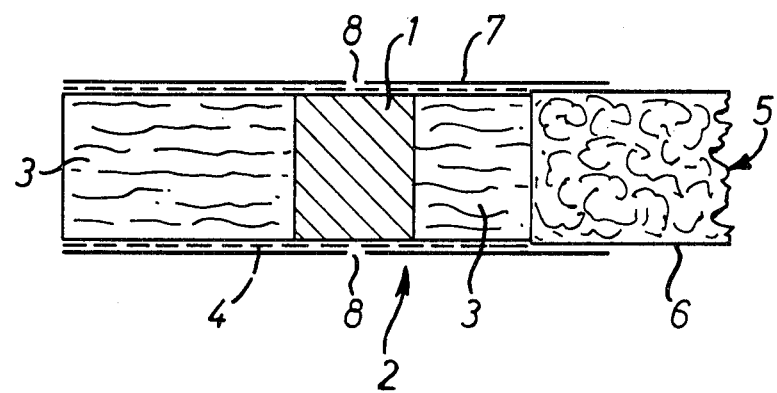

TOBACCO-SMOKE FILTERS

BACKGROUND OF THE INVENTION

Field of the Invention

This invention concerns improvements relating to filters or filtration materials.

Summary of the Invention

It is an object of the invention to provide an improved filter or filtration material for the removal of nitric oxide from a gaseous medium, air for example.

It is a particular object of the invention to provide a filter or filtration material which is effective in practical manner for the removal of nitric oxide in smoke from cigarettes or other smoking articles.

BRIEF DESCRIPTION OF THE DRAWING

The drawing is a cross-sectional side elevation of an embodiment filter of the invention.

DETAILED DESCRIPTION OF THE INVENTION

According to the present invention, a filter or filtration material for nitric oxide removal comprises activated carbon, upon which has been adsorbed a C-nitroso compound, any substituent group or groups of said compound, other than the nitroso group or groups, being of such identity and position in the molecular structure of said compound as to have no adverse effect or no critical adverse effect on the integrity of the nitroso group or groups.

Advantageously, the C-nitroso compound is an aromatic compound.

The activated carbon may be in a fibrous, filamentary or cloth form, but is preferably in particulate form and is preferably granular coal-based carbon. The carbon should be of a porous type, so that it has a relatively high total surface area. Particle size may suitably be in a range of 5 by 50 British Standard Sieve Gauge preferably in a range of 12 by 30. The carbon may be in a bonded condition, at least in a loosely bonded condition permitting access of the smoke to the carbon.

The loading level of the C-nitroso compound on the carbon is suitably in the range of 2% to 15% by weight on an untreated carbon basis and advantageously from 5% to 7%.

Whereas a filter effective to remove at least 30% to 35% by weight of nitric oxide from tobacco smoke would generally be regarded as useful, with a cigarette of high nitric oxide delivery a lower filtration efficiency for nitic oxide, say as low as about 20%, could still be regarded as having utility.

The use in a filter of a C-nitroso compound adsorbed upon activated carbon may be applied in combination with filter ventilation, a synergistic effect being apparently obtainable. In some cases, accordingly a required overall filter efficiency for nitric oxide (NO filtration efficiency) may be attainable in a practically convenient and/or economic fashion by employing the aforesaid combination.

The filtration efficiency for nitric oxide may also be significantly enhanced by employing for the activated carbon one which has been loaded with a suitable metal. For best results the metal must be in the metallic, i.e. zero valency, form. The metal may be copper or iron at a loading level on an untreated carbon basis of up to about 10% by weight. The loading level of the metal may advantageously be in a range of about 1% to 5%. Not only can NO filtration efficiencies within the range obtainable with unmetallised carbon be obtained at much reduced loading levels of C-nitroso compound by metallising the carbon, but even with modest loading levels of metal, NO filtration values can be achieved which significantly exceed those which may be feasibly achieved using unmetallised carbon. Thus with metallised carbons the loading level of the C-nitroso compound may be within a range of about 2% to about 5% on an untreated carbon basis.

Metallisation of the carbon also has the advantage that the filtration material is thereby rendered effective for the removal of a tobacco smoke component additional to nitric oxide, for instance hydrogen cyanide.

EXAMPLE I

Nitrosobenzene was prepared by the method of Coleman et al (Organic Syntheses Collective, Vol. III, edited by E. C. Horning, pp. 668–70) and a quantity of granular activated carbon, supplied under the trade name Anthrasorb CC 1236 by Cardian Chemical Co., of Cheltenham, England, was thoroughly wetted with a solution in ethanol of the nitrosobenzene. The solvent was then allowed to evaporate at room temperature. The resultant loading level of the nitrosobenzene adsorbed on the carbon was 7%.

100 mg of the thus treated granular carbon was disposed in the cavity of a triple filter comprising at each end of the cavity a 5 mm long filter plug of cellulose acetate. The filter was attached to a cigarette rod having a filler of flue-cured tobacco. The thus formed filter cigarette was then smoked under standard smoking conditions, i.e. a 35 cc volume puff of two seconds duration every minute, to a cigarette rod butt length of 8 mm. It was observed that the filter removed 63% by weight of the nitric oxide from the tobacco smoke.

EXAMPLE II

The procedure of Example I was repeated using, with the same loading level, 2-nitrosotoluene, obtained from Aldrich Chemical Co., Ltd. of Gillingham, Dorset, England, instead of the nitrosobenzene. The NO filtration efficiency was observed to be 50%.

EXAMPLE III 2,4,6-trimethylnitrosobenzene was prepared by the method of Di Nunno (Journal of Chemical Society (Section C), 1970, p. 1423). Using this so prepared compound, the procedure of Example I was again repeated. The observed NO filtration efficiency was 40%.

EXAMPLE IV

Example I was repeated using 2,4,6-tri-t-butylnitrosobenzene prepared from 2,4,6-tri-t-butylaniline according to the method of Di Nunno (ibid), the intermediate being prepared by the method of Bartlett (Journal of American Chemical Society, 1956, Vol. 76, p. 2349). The observed NO filtration efficiency was 65%.

EXAMPLE V 4-chloronitrosobenzene was obtained from 4-chloroaniline according to the method of Di Nunno (ibid), and Example I was repeated. The observed NO filtration efficiency was 62%.

EXAMPLE VI

Example I was repeated except that the C-nitroso compound used was 2,4,6-trichloronitrosobenzene. The 2,4,6-trichloronitrosobenzene was obtained by the method of Di Nunno (ibid), the crude product being twice recrystallised from glacial acetic acid. The observed NO filtration efficiency was 38%.

EXAMPLE VII

Example I was repeated using 2-methyl-2-nitrosopropane obtained from Aldrich Chemical Co. Ltd. The observed NO filtration efficiency was 33%.

EXAMPLE VIII

Example I was repeated using 2-methyl-2-nitrosopentan-4-one prepared by the method of Harries et al (Berichte, Vol. 3, 1898, pp. 1399 and 1808). The observed NO filtration efficiency was 59%.

EXAMPLE IX 2,6-dimethyl-6-nitrosohept-2-en-4-one was prepared by treating 4-oxo-tetramethyl-piperidino-1-oxyl bromide with a mixture of aqueous sodium hydroxide and carbon tetrachloride. This C-nitroso compound was used in once again repeating Example I. The observed filtration efficiency for nitric oxide was 55%.

EXAMPLE X

Example I was repeated using N,N-dimethyl-4-nitrosoaniline, obtained from Aldrich Chemical Co. Ltd. The observed NO filtration efficiency as 20%.

The observed NO filtration efficiency obtained using the material of Example X is low. This is because the N,N-dimethylamino group present in the molecular structure of the C-nitroso compound has an adverse effect on the integrity of the nitroso group. However, as mentioned above, in some casdes, an NO filtration efficiency of the material as low as about 20% could be acceptable. The material could, moveover, be used in conjunction with filter ventilation. One mode of providing for such ventilation will be referred to below in connection with Example XIII.

EXAMPLE XI

Nitrosobenzene was adsorbed at various loadings on a number of different granular activated carbons and the respective nitric oxide filtration efficiencies were determined as per Example I but with cigarette rods having blended tobacco fillers. The results are set out in the Table 1 below:

TABLE 1

| Carbon | Loading % | | | | | |
|---|---|---|---|---|---|---|
| | 0 | 2 | 5 | 7 | 10 | 15 |
| | Nitric Oxide Filtration Efficiency (%) | | | | | |
| B.P.L. | 5 | 33 | 47 | 48 | 50 | 55 |
| Anthrasorb CC 1236 | 0 | 25 | 38 | 39 | 41 | 47 |
| MF3 | 0 | 11 | 29 | 29 | 32 | 38 |
| Actibon X | 2 | 23 | 34 | 33 | 38 | 37 |
| Picatif 60143 | 8 | 20 | 30 | 36 | 37 | 36 |
| 207C | 7 | 23 | 33 | 39 | 44 | 43 |

B.P.L. and Anthrasorb CC 1236 are anthracite carbons, the former being supplied by Pittsburgh Activated Carbon Co. of Pennsylvania, U.S.A. MF3, Picatif 60143 and 207C are coconut based carbons supplied respectively by Chemviron Ltd., of Brussels, Belgium; Société Pica, of Paris, France; and Sutcliffe-Speakman Ltd., of Leigh, Lancashire, England. Actibon X is a wood based carbon supplied by Hooker-Mexicana S.A., of Mexico.

From the above Table it may be seen that as the loading of nitrosobenzene is increased from 0% to 5% the NO filtration efficiencies, for all of the carbons, increase rapidly, whereas when the loading levels are further increased up to 15% the NO filtration efficiencies rise more gradually. These results indicate that an optimum loading lies within an approximate range of 5%–7%.

EXAMPLE XII

Example I was repeated using nitrosobenzene at a loading level of 5% on Anthrasorb CC 1844 granular activated carbon. The cigarette rod had a filler of blended tobacco. The observed NO filtration efficiency was 53%.

EXAMPLE XIII

Nitrosobenzene was adsorbed at a 5% loading level on B.P.L. granular activated carbon. A 100 mg amount of the treated carbon was disposed in the cavity 1 of each of a number of triple filters 2 having, at each end of the cavity 1, a cellulose acetate filter plug 3, as illustrated by the single figure of the accompanying drawing, which is a diagrammatic longitudinal section through a filter. Each filter, enclosed in a porous plug-wrap 4, was attached to a cigarette rod 5 having a filler of blended tobacco within a wrapper 6. The filters 2, otherwise identical, were attached to respective rods 5 by tippings 7 provided with varying numbers of rows of laser-formed microperforations 8 disposed around a central region of the cavity 1 to give varying degrees of ventilation.

The thus formed filter cigarettes, and control cigarettes, of similar delivery, were smoked under standard smoking conditions to a cigarette-rod butt length of 8 mm and the nitric oxide delivery for each cigarette was determined. The control cigarettes varied from the above-described cigarettes in that the cavities of the filters thereof contained 100 mg of untreated B.P.L. granular activated carbon.

The results are set out in Table 2 below:

TABLE 2

| Ventilation (%) | Untreated BPL Carbon | | BPL impregnated with 5% Nitrosobenzene | | | Expected Retention due to Nitrosobenzene (%) |
|---|---|---|---|---|---|---|
| | Delivery (μg/cig) | Reduction due to Ventilation (%) | Delivery (μg/cig) | Total Reduction (%) due to vent$^n$ + Nitrosobenzene | Retention due to Nitrosobenzene (%) | |
| 0 | 210 | — | 123 | 41 | 41 | 42 |
| 23 | 148 | 30 | 74 | 65 | 50 | 46 |
| 43 | 118 | 44 | 41 | 80 | 65 | 48 |
| 58 | 88 | 58 | 21 | 90 | 76 | 50 |
| 59 | 77 | 63 | 19 | 91 | 75 | 51 |

The values for expected nitric oxide retention due to the nitrosobenzene were derived from a relationship between retention and nitric oxide delivery determined by attaching non-ventilated triple filters, each containing 100 mg of B.P.L. granular activated carbon carrying a 5% loading of nitrosobenzene, to cigarette rods of different, predetermined, nitric oxide deliveries. The relationship was found to be a virtually straight-line relationship.

A comparison of the actual and expected values of nitric oxide retention shows that with increasing ventilation the actual retention is increasingly higher than the expected retention. That is to say, a synergistic effect is obtained.

A similar synergistic effect on nitric oxide retention was observed when the ventilation perforations were positioned over the mouth end cellulose acetate plugs instead of over the cavities. When the perforations were positioned over the tobacco end plugs the synergism was less pronounced.

EXAMPLE XIV

B.P.L. granular activated carbons with zero, 0.1%, 1%, 5% and 10% loading levels of copper were impregnated with nitrosobenzene at loading levels of zero, 1%, 2%, 5%, 10% and 15% on a metallised carbon basis.

100 mg amounts of the respective carbons were disposed in the cavities of triple filters, each filter comprising at each end of the cavity a 5 mm long plug of cellulose acetate. The filters were attached to cigarette rods having a filler of blended tobacco. Each cigarette rod was such as to give a nitric oxide delivery of about 200 $\mu$g when no filter was attached. The thus formed filter cigarettes were then smoked under standard smoking conditions. In each case a determination was made of the NO filtration efficiency of the filter. The results obtained are shown in Table 3 below:

TABLE 3

| Loading Nitroso-benzene (%) | Loading Copper % | | | | |
|---|---|---|---|---|---|
| | 0 | 0.1 | 1.0 | 5.0 | 10.0 |
| | Nitric Oxide Filtration Efficiencies (%) | | | | |
| 0 | <10 | <10 | <10 | <10 | <10 |
| 1.0 | 17 | 25 | 37 | 33 | 26 |
| 2.0 | 36 | 40 | 48 | 48 | 41 |
| 5.0 | 42 | 46 | 62.5 | 65 | 54.5 |
| 10.0 | 43 | 56.5 | 65 | 61 | 54 |
| 15.0 | 47 | 58 | 67.5 | 67 | 53 |

From Table 3 it may be seen that even a loading level of copper as low as 0.1% improves the NO filtration efficiency at all of the loading levels of nitrosobenzene. A 1.0% loading of copper results in even more significantly enhanced NO filtration efficiencies. An increase in copper loading to a 5% level results in NO filtration efficiencies closely similar to those obtained at a 1% loading. An increase to a 10% loading results in NO filtration efficiencies lower that those obtained at the 1% and 5% loadings and, for higher nitrosobenzene loadings, the filtration efficiencies are even lower than those obtained with 0.1% copper. It may thus be deduced that when using nitrosobenzene as the C-nitroso compound and selecting B.P.L. as the activated carbon, optimum copper loading levels are in a range of about 1% to about 5%. It may also be observed that any particular loading level of copper there is a steep rise in the NO filtration efficiency on increasing the loading level of nitrosobenzene from zero to 2%, but that only relatively small increases in NO filtration efficiency result from going from 5% to 10% to 15%, in nitrosobenzene loading levels. Hence there is no apparent benefit in using loading levels of nitrosobenzene greater than about 5% particularly when the copper loading level is in the range of about 1% to 5%.

EXAMPLE XV

The procedure of Example XIV was followed except that activated carbons loaded with iron were used, the carbons again being of B.P.L. type. The results obtained with the iron-loaded carbons are shown in Table 4 below:

TABLE 4

| Loading Nitroso-benzene (%) | Loading Iron % | | | | |
|---|---|---|---|---|---|
| | 0 | 0.1 | 1.0 | 5.0 | 10.0 |
| | Nitric Oxide Filtration Efficiencies (%) | | | | |
| 0 | <10 | <10 | <10 | <10 | <10 |
| 1.0 | 17 | 21 | 26 | 25 | 25 |
| 2.0 | 36 | 30 | 41 | 37 | 40 |
| 5.0 | 42 | 40 | 50 | 48 | 44 |
| 10.0 | 43 | 45 | 58 | 50 | 42 |
| 15.0 | 47 | 52 | 61 | 54 | 51 |

As may be seen from Table 4 the general pattern of results is similar to that obtained using the copper-loaded carbons, although the enhancement in NO filtration efficiencies over non-metallised carbon is not quite so pronounced as was the case with copper metallisation. The results do though illustrate an effect of very definite utility especially when the relatively lower cost of iron-loaded carbons is taken into account. It may also be observed from Table 4 that the NO filtration efficiencies at a 5% loading level of iron are not closely similar to the filtration efficiencies at a 1% loading level, as was the case with copper loaded carbons, but are somewhat lower. Thus it may be concluded that with nitrosobenzene-treated B.P.L. carbons optimum loadings of iron are in the region of the 1% level.

Although in the above examples the C-nitroso treated carbons are deposited in the cavities of triple filters, they may, of course, be otherwise incorporated in cigarette filters. For example, a C-nitroso treated carbon could be dispersed throughout a plug of cellulose acetate or other fibrous filtration material.

Provision for filter ventilation, for example as discussed with reference to Example XIII, may be utilised also in conjunction with filters in accordance with any of the above Examples.

What is claimed is:

1. A nitric oxide filtration material which comprises; activated carbon upon which has been adsorbed a C-nitroso compound, said compound having at least one nitroso group which will react to remove said nitric oxide.

2. A filtration material according to claim 1, wherein the C-nitroso compound is an aromatic compound.

3. A filtration material according to claim 2, wherein the C-nitroso compound is nitrosobenzene.

4. A filtration material according to claim 2, wherein the C-nitroso compound is 2-nitrosotoluene.

5. A filtration material according to claim 2, wherein the C-nitroso compound is 2,4,6-trimethylnitrosobenzene.

6. A filtration material according to claim 1, wherein the activated carbon is a coal-based carbon.

7. A filtration material according to claim 1, wherein the activated carbon is in particulate form.

8. A filtration material according to claim 1, wherein the activated carbon has been loaded with a metal.

9. A filtration material according to claim 8, wherein the metal comprises a metal of the group consisting of copper and iron.

10. A filtration material according to claim 9, wherein the loading level of the metal is in the range of 0.1% to 5% by weight on an untreated carbon basis.

11. A filtration material according to claim 1, wherein the loading level of the C-nitroso compound is in the range of 2% to 15% by weight on an untreated carbon basis.

12. A filtration material according to claim 11, wherein the loading level of the C-nitroso compound is in the range of 2% to 7%.

13. A filter comprising a filtration material according to claim 1.

14. A smoking article filter comprising a filtration material according to claim 8.

15. A filter according to claim 14, and additionally comprising ventilation means arranged to provide air into the filter.

16. A method for the filtration of nitric oxide from a gaseous medium which comprises passing said medium in contact with a filtration material according to claim 1.

* * * * *